(12) United States Patent
AlKawai (10) Patent No.: US 11,680,475 B2
(45) Date of Patent: Jun. 20, 2023

(54) LINEAR CALIBRATION METHOD FOR LITHOSTATIC STRESS RESULTS FROM BASIN MODELING

(71) Applicant: SAUDI ARABIAN OIL COMPANY, Dhahran (SA)

(72) Inventor: Wisam AlKawai, Qatif (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 122 days.

(21) Appl. No.: 17/162,337

(22) Filed: Jan. 29, 2021

(65) Prior Publication Data

US 2022/0243574 A1 Aug. 4, 2022

(51) Int. Cl.
*E21B 44/00* (2006.01)
*E21B 49/00* (2006.01)

(52) U.S. Cl.
CPC ............ *E21B 44/00* (2013.01); *E21B 49/006* (2013.01); *E21B 2200/20* (2020.05)

(58) Field of Classification Search
CPC ..... E21B 44/00; E21B 49/006; E21B 2200/20
See application file for complete search history.

(56) References Cited

U.S. PATENT DOCUMENTS

| 6,533,045 | B1 | 3/2003 | Cooper |
| 6,977,866 | B2 | 12/2005 | Huffman et al. |
| 7,280,918 | B2 | 10/2007 | Williams |
| 8,567,525 | B2 * | 10/2013 | Reitsma ................. E21B 21/08 175/48 |
| 2009/0119076 | A1 | 5/2009 | Madatov et al. |
| 2014/0012506 | A1 | 1/2014 | Adsit |
| 2014/0233352 | A1 | 8/2014 | Kacewicz et al. |
| 2015/0276978 | A1 * | 10/2015 | Dupuy ................. G01V 99/005 702/11 |
| 2016/0010444 | A1 * | 1/2016 | AlQahtani .......... E21B 41/0092 703/10 |
| 2016/0282513 | A1 * | 9/2016 | Holmes ................ G01V 99/005 |

(Continued)

FOREIGN PATENT DOCUMENTS

| CA | 2687006 C | * | 2/2014 | ............. G01V 11/00 |
| CA | 2961461 C | * | 7/2019 | ......... E21B 41/0092 |
| WO | WO-2021048597 A1 | * | 3/2021 | |

OTHER PUBLICATIONS

O.A.A. Fadipe and et al, "Basin Scale Geomechanical Modeling of Tight Carbonate Reservoir in Abu Dhabi: Implications on Pore Pressure Development", the Abu Dhabi International Petroleum Exhibition & Conference, Abu Dhabi, UAE, Nov. 2016 (Year: 2016).*

(Continued)

*Primary Examiner* — Douglas Kay
(74) *Attorney, Agent, or Firm* — Osha Bergman Watanabe & Burton LLP (57) ABSTRACT

A method, a system, and a non-transitory computer readable medium to calibrate a lithostatic stress map of a particular geological layer in a basin model are described. The lithostatic stress map is generated by simulating the basin model and calibrated based on available well data without re-simulating the basin model. In particular, the calibration is based on the mean lithostatic density, which is a constant value of density that yields a value of lithostatic stress equivalent to the lithostatic stress at the same depth produced by the existing column of rocks in the basin.

20 Claims, 5 Drawing Sheets

(56) References Cited

U.S. PATENT DOCUMENTS

| | | | |
|---|---|---|---|
| 2017/0254909 A1* | 9/2017 | Agharazi | G01V 1/288 |
| 2018/0067220 A1 | 3/2018 | Flemings et al. | |
| 2018/0284305 A1 | 10/2018 | Kacewicz et al. | |
| 2019/0179873 A1 | 6/2019 | Schirrmann et al. | |
| 2019/0196060 A1 | 6/2019 | Ducros et al. | |
| 2020/0103549 A1 | 4/2020 | Oppert et al. | |
| 2021/0132026 A1* | 5/2021 | Nie | G01N 33/24 |

OTHER PUBLICATIONS

C. Guerra, "Stress and Fracture Prediction Using Geomechanical Reservoir Models", Technische Universitat Darmstadt, May 2019 (Year: 2019).*

Hantschel, Thomas and Armin I. Kauerauf, "Pore Pressure, Compaction and Tectonics", Fundamentals of Basin and Petroleum Systems Modeling, Springer-Verlag Berlin Heidelberg, 2009, pp. 31-101 (71 pages).

Guerra, Clairet, "Stress and Fracture Prediction Using Geomechanical Reservoir Models—A Case Study from the Lower Magdalena Valley Basin, Colombia", Technische Universität Darmstadt, May 2019 (232 pages).

Singha, Dip Kumar and Rima Chatterjee, "Detection of overpressure zones and a statistical model of pore pressure estimation from well logs in the Krishna-Godavari Basin, India", Geochemistry, Geophysics, Geosystems, AGU Publications, American Geophysical Union, Apr. 2014, pp. 1009-1020 (12 pages).

Jiménez, Jenny-Mabel Carvajal et al., "Geomechanical Wellbore Stability Modeling of Exploratory Wells—Study Case at Middle Magdalena Basin", Ciencia, Tecnologia y Futuro, vol. 3, No. 3, Dec. 2007, pp. 85-102 (18 pages).

International Search Report and Written Opinion issued in Application No. PCT/US2022/014340, dated May 2, 2022 (19 pages).

J.M. Verweij et al.; "3D spatial variation in vertical stress in on- and offshore Netherlands; integration of desnity log measurements and basin modeling results", Marine and Petroleum Geology; vol. 78; Jul. 1, 2016; pp. 870-882 (13 pages).

V. Roche and M. van der Baan; "Modeling of the in situ state of stress in elastic layered lock subject to stress and strain-driven tectonic forces", Solid Earth; vol. 8; No. 2; Jan. 2017; pp. 479-498 (20 pages).

* cited by examiner

LINEAR CALIBRATION METHOD FOR LITHOSTATIC STRESS RESULTS FROM BASIN MODELING

BACKGROUND

A basin is a space created from sinking or gradual downward settling of the earth surface. The basin may be in-filled with sediments and is referred to as a sediment basin. Basin modeling is a technique to evaluate potential hydrocarbon reserves in a basin, such as a sedimentary basin. Software packages have been designed for basin modelling purposes to simulate the geologic processes of deposition, burial, erosion/uplift, hydrocarbon generation, migration, and accumulation in sedimentary basins. Basin modeling generates predictions of various rock properties as well as pressure and temperature conditions over geologic time in the sedimentary basin. The prediction of lithostatic stresses and pore pressures from basin modeling are used in well planning in order to assess the expected subsurface pressure conditions at potential well locations.

SUMMARY

In general, in one aspect, the invention relates to a method for calibrating lithostatic stress in a basin model of a subterranean formation. The method includes generating, for each of a plurality of geological layers in the basin model, a mean lithostatic density map from a lithostatic stress map, the plurality of geological layers corresponding to a plurality of depths in the subterranean formation, generating, from a well log, a plurality of calculated mean lithostatic densities at the well location, the plurality of calculated mean lithostatic densities corresponding to the plurality of depths of the plurality of geological layers, extracting, using a computer processor and from the mean lithostatic density map of said each of a plurality of geological layers, a plurality of extracted mean lithostatic density values corresponding to the plurality of depths at the well location, generating, using the computer processor and by applying linear regression to the plurality of calculated mean lithostatic densities and the plurality of extracted mean lithostatic density values, one or more calibration coefficients for calibrating the lithostatic stress in the basin model, and generating, using the computer processor and based on the one or more calibration coefficients, a calibrated lithostatic stress map from the lithostatic stress map, wherein the calibrated lithostatic stress map is used to facilitate a drilling operation of the subterranean formation.

In general, in one aspect, the invention relates to a computer system for calibrating lithostatic stress in a basin model of a subterranean formation. The system includes a processor, and a memory coupled to the processor and storing instruction, the instructions, when executed by the processor, comprising functionality for generating, for each of a plurality of geological layers in the basin model, a mean lithostatic density map from a lithostatic stress map, the plurality of geological layers corresponding to a plurality of depths in the subterranean formation, generating, from a well log, a plurality of calculated mean lithostatic densities at the well location, the plurality of calculated mean lithostatic densities corresponding to the plurality of depths of the plurality of geological layers, extracting, from the mean lithostatic density map of said each of a plurality of geological layers, a plurality of extracted mean lithostatic density values corresponding to the plurality of depths at the well location, generating, by applying linear regression to the plurality of calculated mean lithostatic densities and the plurality of extracted mean lithostatic density values, one or more calibration coefficients for calibrating the lithostatic stress in the basin model, and generating, based on the one or more calibration coefficients, a calibrated lithostatic stress map from the lithostatic stress map, wherein the calibrated lithostatic stress map is used to facilitate a drilling operation of the subterranean formation.

In general, in one aspect, the invention relates to a non-transitory computer readable medium storing instructions executable by a computer processor for calibrating lithostatic stress in a basin model of a subterranean formation. The instructions, when executed by the processor, comprising functionality for generating, for each of a plurality of geological layers in the basin model, a mean lithostatic density map from a lithostatic stress map, the plurality of geological layers corresponding to a plurality of depths in the subterranean formation, generating, from a well log, a plurality of calculated mean lithostatic densities at the well location, the plurality of calculated mean lithostatic densities corresponding to the plurality of depths of the plurality of geological layers, extracting, from the mean lithostatic density map of said each of a plurality of geological layers, a plurality of extracted mean lithostatic density values corresponding to the plurality of depths at the well location, generating, by applying linear regression to the plurality of calculated mean lithostatic densities and the plurality of extracted mean lithostatic density values, one or more calibration coefficients for calibrating the lithostatic stress in the basin model, and generating, based on the one or more calibration coefficients, a calibrated lithostatic stress map from the lithostatic stress map, wherein the calibrated lithostatic stress map is used to facilitate a drilling operation of the subterranean formation.

Other aspects and advantages will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of the invention provide a method, a system, and a non-transitory computer readable medium to calibrate a lithostatic stress map of a particular geological layer in a basin model. The lithostatic stress map is generated by simulating the basin model and calibrated based on available well data without re-simulating the basin model. In one or more embodiments of the invention, the calibration is based on the mean lithostatic density, which is defined as a constant value of density that yields a value of lithostatic stress equivalent to the lithostatic stress at the same depth produced by the existing column of rocks in the basin.

Figure 1:
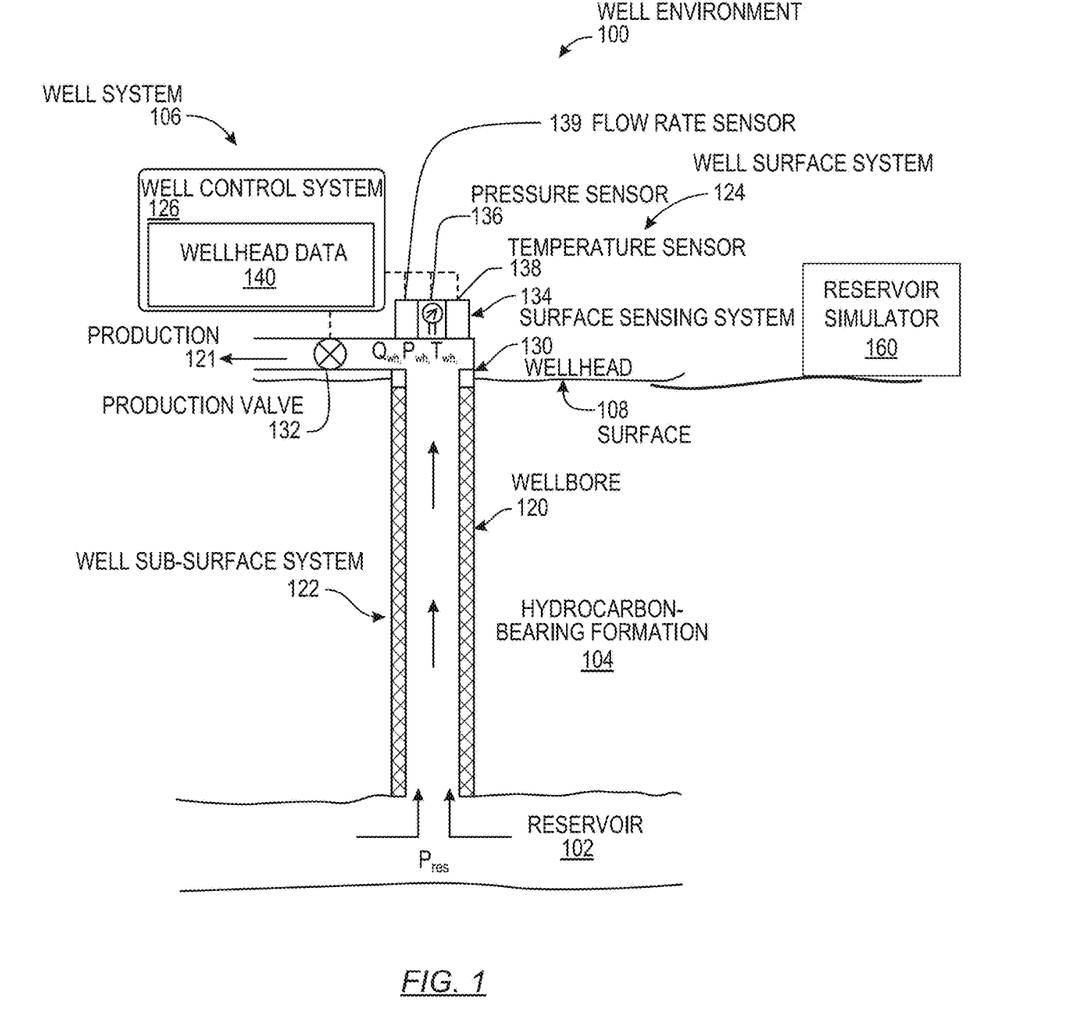
FIGS. 1 and 2 show systems in accordance with one or more embodiments.

Turning to FIG. 1, FIG. 1 shows a schematic diagram in accordance with one or more embodiments. As shown in FIG. 1, FIG. 1 illustrates a well environment (100) that includes a hydrocarbon reservoir ("reservoir") (102) located in a subsurface hydrocarbon-bearing formation ("formation") (104) and a well system (106). The hydrocarbon-bearing formation (104) may include a porous or fractured rock formation that resides underground, beneath the earth's surface ("surface") (108). In the case of the well system (106) being a hydrocarbon well, the reservoir (102) may include a portion of the hydrocarbon-bearing formation (104). The hydrocarbon-bearing formation (104) and the reservoir (102) may include different layers of rock having varying characteristics, such as varying degrees of permeability, porosity, capillary pressure, and resistivity. In the case of the well system (106) being operated as a production well, the well system (106) may facilitate the extraction of hydrocarbons (or "production") from the reservoir (102).

In some embodiments, the well system (106) includes a wellbore (120), a well sub-surface system (122), a well surface system (124), and a well control system ("control system") (126). The control system (126) may control various operations of the well system (106), such as well production operations, well completion operations, well maintenance operations, and reservoir monitoring, assessment and development operations. In some embodiments, the control system (126) includes a computer system that is the same as or similar to that of computer system (600) described below in FIGS. 6A and 6B and the accompanying description.

The wellbore (120) may include a bored hole that extends from the surface (108) into a target zone of the hydrocarbon-bearing formation (104), such as the reservoir (102). An upper end of the wellbore (120), terminating at or near the surface (108), may be referred to as the "up-hole" end of the wellbore (120), and a lower end of the wellbore, terminating in the hydrocarbon-bearing formation (104), may be referred to as the "down-hole" end of the wellbore (120). The wellbore (120) may facilitate the circulation of drilling fluids during drilling operations, the flow of hydrocarbon production ("production") (121) (e.g., oil and gas) from the reservoir (102) to the surface (108) during production operations, the injection of substances (e.g., water) into the hydrocarbon-bearing formation (104) or the reservoir (102) during injection operations, or the communication of monitoring devices (e.g., logging tools) into the hydrocarbon-bearing formation (104) or the reservoir (102) during monitoring operations (e.g., during in situ logging operations).

In some embodiments, during operation of the well system (106), the control system (126) collects and records wellhead data (140) for the well system (106). The wellhead data (140) may include, for example, a record of measurements of wellhead pressure ($P_{wh}$) (e.g., including flowing wellhead pressure), wellhead temperature ($T_{wh}$) (e.g., including flowing wellhead temperature), wellhead production rate ($Q_{wh}$) over some or all of the life of the well (106), and water cut data. In some embodiments, the measurements are recorded in real-time, and are available for review or use within seconds, minutes or hours of the condition being sensed (e.g., the measurements are available within 1 hour of the condition being sensed). In such an embodiment, the wellhead data (140) may be referred to as "real-time" wellhead data (140). Real-time wellhead data (140) may enable an operator of the well (106) to assess a relatively current state of the well system (106), and make real-time decisions regarding development of the well system (106) and the reservoir (102), such as on-demand adjustments in regulation of production flow from the well.

In some embodiments, the well sub-surface system (122) includes casing installed in the wellbore (120). For example, the wellbore (120) may have a cased portion and an uncased (or "open-hole") portion. The cased portion may include a portion of the wellbore having casing (e.g., casing pipe and casing cement) disposed therein. The uncased portion may include a portion of the wellbore not having casing disposed therein. In some embodiments, the casing includes an annular casing that lines the wall of the wellbore (120) to define a central passage that provides a conduit for the transport of tools and substances through the wellbore (120). For example, the central passage may provide a conduit for lowering logging tools into the wellbore (120), a conduit for the flow of production (121) (e.g., oil and gas) from the reservoir (102) to the surface (108), or a conduit for the flow of injection substances (e.g., water) from the surface (108) into the hydrocarbon-bearing formation (104). In some embodiments, the well sub-surface system (122) includes production tubing installed in the wellbore (120). The production tubing may provide a conduit for the transport of tools and substances through the wellbore (120). The production tubing may, for example, be disposed inside casing. In such an embodiment, the production tubing may provide a conduit for some or all of the production (121) (e.g., oil and gas) passing through the wellbore (120) and the casing.

In some embodiments, the well surface system (124) includes a wellhead (130). The wellhead (130) may include a rigid structure installed at the "up-hole" end of the wellbore (120), at or near where the wellbore (120) terminates at the Earth's surface (108). The wellhead (130) may include structures for supporting (or "hanging") casing and production tubing extending into the wellbore (120). Production (121) may flow through the wellhead (130), after exiting the wellbore (120) and the well sub-surface system (122), including, for example, the casing and the production tubing. In some embodiments, the well surface system (124) includes flow regulating devices that are operable to control the flow of substances into and out of the wellbore (120). For example, the well surface system (124) may include one or more production valves (132) that are operable to control the flow of production (121). For example, a production valve (132) may be fully opened to enable unrestricted flow of production (121) from the wellbore (120), the production valve (132) may be partially opened to partially restrict (or "throttle") the flow of production (121) from the wellbore (120), and production valve (132) may be fully closed to fully restrict (or "block") the flow of production (121) from the wellbore (120), and through the well surface system (124).

In some embodiments, the wellhead (130) includes a choke assembly. For example, the choke assembly may include hardware with functionality for opening and closing the fluid flow through pipes in the well system (106). Likewise, the choke assembly may include a pipe manifold that may lower the pressure of fluid traversing the wellhead. As such, the choke assembly may include set of high pressure valves and at least two chokes. These chokes may be fixed or adjustable or a mix of both. Redundancy may be provided so that if one choke has to be taken out of service, the flow can be directed through another choke. In some embodiments, pressure valves and chokes are communicatively coupled to the well control system (126). Accordingly, a well control system (126) may obtain wellhead data regarding the choke assembly as well as transmit one or more commands to components within the choke assembly in order to adjust one or more choke assembly parameters.

Keeping with FIG. 1, in some embodiments, the well surface system (124) includes a surface sensing system (134). The surface sensing system (134) may include sensors for sensing characteristics of substances, including production (121), passing through or otherwise located in the well surface system (124). The characteristics may include, for example, pressure, temperature and flow rate of production (121) flowing through the wellhead (130), or other conduits of the well surface system (124), after exiting the wellbore (120).

In some embodiments, the surface sensing system (134) includes a surface pressure sensor (136) operable to sense the pressure of production (121) flowing through the well surface system (124), after it exits the wellbore (120). The surface pressure sensor (136) may include, for example, a wellhead pressure sensor that senses a pressure of production (121) flowing through or otherwise located in the wellhead (130). In some embodiments, the surface sensing system (134) includes a surface temperature sensor (138) operable to sense the temperature of production (121) flowing through the well surface system (124), after it exits the wellbore (120). The surface temperature sensor (138) may include, for example, a wellhead temperature sensor that senses a temperature of production (121) flowing through or otherwise located in the wellhead (130), referred to as "wellhead temperature" ($T_{wh}$). In some embodiments, the surface sensing system (134) includes a flow rate sensor (139) operable to sense the flow rate of production (121) flowing through the well surface system (124), after it exits the wellbore (120). The flow rate sensor (139) may include hardware that senses a flow rate of production (121) ($Q_{wh}$) passing through the wellhead (130).

In some embodiments, the well system (106) includes a simulator (160). For example, the simulator (160) may include hardware and/or software with functionality for generating one or more reservoir and/or basin models regarding the hydrocarbon-bearing formation (104) and/or performing one or more reservoir and/or basin simulations. While the simulator (160) is shown at a well site, embodiments are contemplated where reservoir and/or basin simulators are located away from well sites. In some embodiments, the simulator (160) may include a computer system that is similar to the computer system (600) described below with regard to FIGS. 6A and 6B and the accompanying description.

Figure 2:
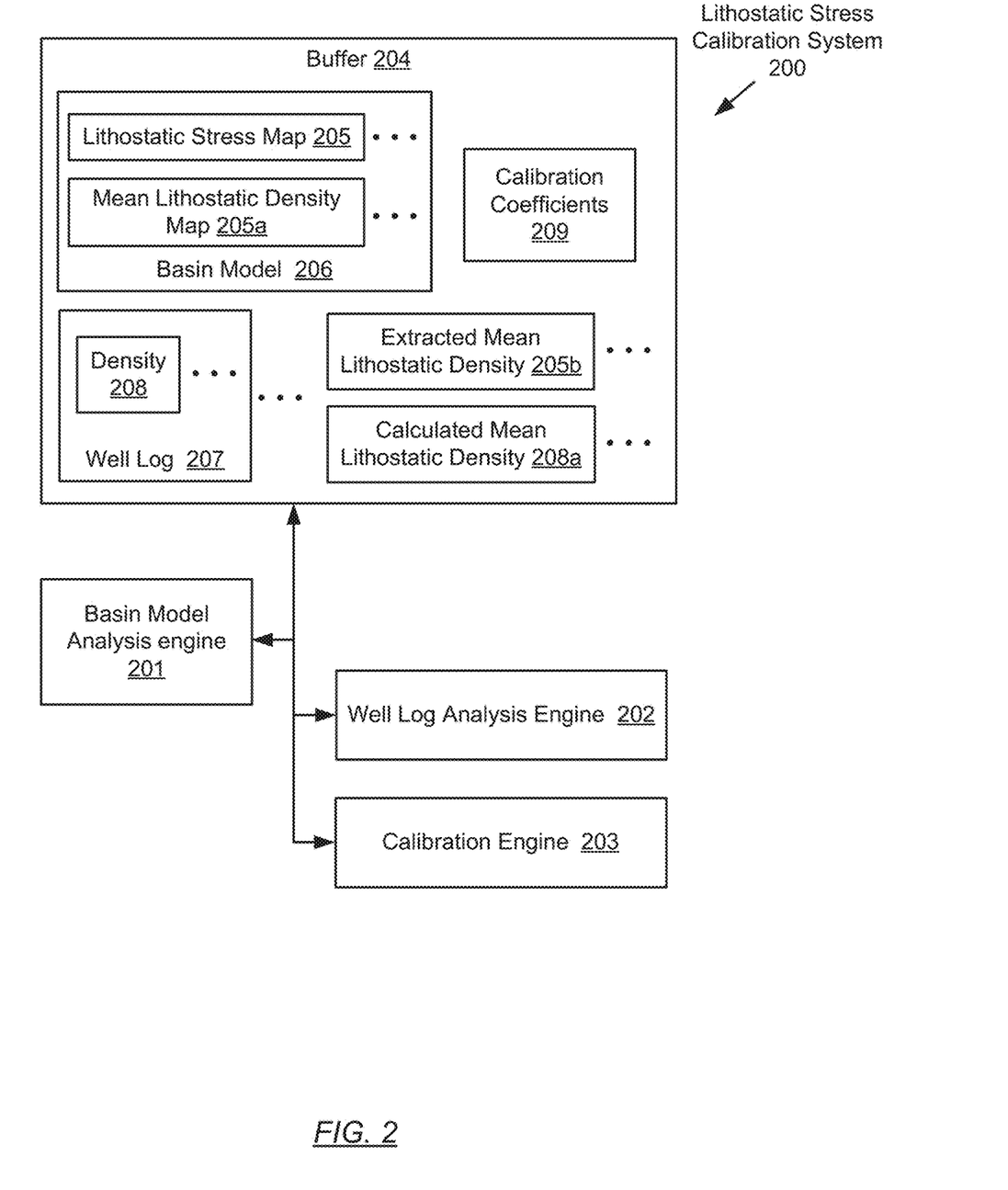

Turning to FIG. 2, FIG. 2 shows a schematic diagram in accordance with one or more embodiments. In one or more embodiments, one or more of the modules and/or elements shown in FIG. 2 may be omitted, repeated, and/or substituted. Accordingly, embodiments of the invention should not be considered limited to the specific arrangements of modules and/or elements shown in FIG. 2.

As shown in FIG. 2, FIG. 2 illustrates the lithostatic stress calibration system (200) that has multiple components, including, for example, a buffer (204), a basin model analysis engine (201), a well log analysis engine (202), and a calibration engine (203). Each of these components (201, 202, 203, 204) may be located on the same computing device (e.g., personal computer (PC), laptop, tablet PC, smart phone, multifunction printer, kiosk, server, etc.) or on different computing devices that are connected via a network, such as a wide area network or a portion of Internet of any size having wired and/or wireless segments. Each of these components is discussed below.

In one or more embodiments of the invention, the buffer (204) may be implemented in hardware (i.e., circuitry), software, or any combination thereof. The buffer (204) is configured to store data generated and/or used by the lithostatic stress calibration system (200). The data stored in the buffer (204) includes the basin model (206), the well log (207), the extracted lithostatic density (205a), the calculated mean lithostatic density (208a), and the calibration coefficients (209). The basin model (206) is a mathematical model for analyzing the formation and evolution of a basin to evaluate potential hydrocarbon reserves of the basin. In one or more embodiments, the basin model (206) includes modeled information for geological layers in the basin. A geological layer is a subterranean layer of sedimentary rock or soil, or igneous rock formed with internally consistent characteristics that is distinguishable from other geological layers. The modeled information in the basin model (206) includes lithostatic stress maps (e.g., lithostatic stress map (205)) and corresponding mean lithostatic density maps (e.g., mean lithostatic density map (205a)) for the geological layers in the basin. Lithostatic stress is the pressure or stress imposed on a layer of soil or rock (e.g., a geological layer) by the weight of overlying material. The lithostatic stress map (205) specifies lithostatic stress values for multiple locations of a corresponding geological layer. In general, the geological layer has varying depths across the basin. Accordingly, the lithostatic stress value specified at a particular location (e.g., a well location) in the lithostatic stress map (205) corresponds to the depth of the geological layer at the particular location (e.g., the well location).

The mean lithostatic density is defined as a constant value of equivalent density that yields a value of lithostatic stress at particular depth (denoted as "d") equivalent to the lithostatic stress at the same depth d produced by the weight of the existing column of rocks in the basin. In other words, the value of the mean lithostatic density equals the value of lithostatic stress divided by the corresponding depth d. The mean lithostatic density can vary laterally due to heterogeneities in the rock columns in the basin. The mean lithostatic density map (205a) and the corresponding lithostatic stress map (205) are associated with the same geological layer. The mean lithostatic density map (205a) is converted from the corresponding lithostatic stress map (205) by dividing the lithostatic stress values by respective depths at multiple locations of the geological layer. The extracted mean lithostatic density (205b) is a mean lithostatic density value extracted from the mean lithostatic density map (205a) based on a location, such as a well location.

The well log (207) is a record of subterranean formation information as a function of depth along a borehole of a well. For example, the well log (207) includes rock density measurements (e.g., density (208)) at multiple depths along a well.

In mathematical terms, the mean lithostatic density, $\rho_{lithostatic}$, is expressed at point $(x_0, y_0, d)$ in the basin as:

$$\rho_{lithostatic}(x_0, y_0, d) = \frac{\int_0^d \rho(x_0, y_0, z) g \, dz}{gd} \qquad (1)$$

In equation (1), g is the gravitational constant and $\rho(x_0, y_0, z)$ is the density of the existing column of rocks at the depth z where z is in the range of integral from 0 (i.e., at the surface) to d. Because the lithostatic stress map (205), the mean lithostatic density map (205a), and the extracted mean lithostatic density (205b) are based on modeled information in the basin model (206), the extracted mean lithostatic density (205b) may deviate from the result of the equation (1) and may be calibrated based on the well log (208).

In particular, the integral of equation (1) is the weight of the existing column of rocks and is approximated into the summation form:

$$\rho_{lithostatic}(x_0, y_0, d) \approx \rho_{lithoC}(x_0, y_0, d) = \qquad (2)$$

$$\frac{g \sum_{k=1}^n \rho_i \Delta z_i}{gd} = \frac{\rho_1 + \rho_2 + \ldots + \rho_n}{n}$$

In equation (2), $\rho_n$ is the density value of an $n^{th}$ geological layer of depth d at the location $(x_0, y_0)$ in the basin. In other words, the mean lithostatic density, $\rho_{lithostatic}$, equals an average density of the $1^{st}$ geological layer through $n^{th}$ geological layer at the location $(x_0, y_0)$. In one or more embodiments, in equation (2) for $(x_0, y_0)$ at a well location, $\rho_n$ is substituted or otherwise interpolated using rock density measurements (e.g., density (208)) of the well log (207). In such embodiments, the calculated mean lithostatic density (208a) is the calculated value of the mean lithostatic density, $\rho_{lithoC}$, based on the well log (207). In other words, the calculated mean lithostatic density (208a) is $\rho_{lithoC}$ as calculated using equation (2) by substituting/approximating $\rho_1$ through $\rho_n$ using rock density measurements (e.g., density (208)) of the well log (207). Because the calculated mean lithostatic density (208a) is based on actual measured data for calibration purposes, $\rho_{lithoC}$ is also referred to as the calibrated mean lithostatic density value.

In one or more embodiments of the invention, the calibrated mean lithostatic density value $\rho_{lithoC}$ of the $n^{th}$ geological layer having the depth d at a well location $(x_0, y_0)$ is expressed as:

$$\rho_{lithoC}(x_0, y_0, d) = A_n \rho_{lithoE}(x_0, y_0, d) + B_n \qquad (3)$$

In equation (3), $A_n$ and $B_n$ are the calibration coefficients (209) for the $n^{th}$ geological layer in the basin model and $\rho_{lithoE}$ is the extracted mean lithostatic density (e.g., extracted mean lithostatic density (205b)) from a mean lithostatic density map (e.g., mean lithostatic density map (205a)) of the $n^{th}$ geological layer. When applying equation (3) into equation (2) where $\rho_n$ is approximated using rock density measurements (e.g., density (208)) of the well log (207), it is deduced that the calibrated mean lithostatic density of a basin model at a depth d, $\rho_{lithoC}(d)$, is:

$$\rho_{lithoC}(d) = \frac{(A_1 \rho_{1+} B_1) + (A_2 \rho_{2+} B_2) + \ldots + (A_n \rho_{n+} B_n)}{n} \qquad (4)$$

Equation (4) shows that the calibration of mean lithostatic density in a basin model is achieved through linear regression with the mean lithostatic density calculated from well data as long as the standard deviation of the calibration coefficients of the geological layers is relatively small. In one or more embodiments of the invention, the coefficients $A_n$ and $B_n$ are assumed to be constant from $1^{st}$ geological layer through $n^{th}$ geological layer. The quality of linear regression is evaluated by mathematical means such as the error in the predicted mean lithostatic density and R-square.

In one or more embodiments of the invention, each of the basin model analysis engine (201), well log analysis engine (202), and calibration engine (203) may be implemented in hardware (i.e., circuitry), software, or any combination thereof. In one or more embodiments, the basin model analysis engine (201) is configured to convert the lithostatic stress maps (e.g., lithostatic stress map (205)) to corresponding mean lithostatic density maps (e.g., mean lithostatic density map (205a)). In other words, each stress value in the lithostatic stress map is divided by the corresponding depth in the geological layer to yield the mean lithostatic density value in the mean lithostatic density map.

In one or more embodiments, the well log analysis engine (202) is configured to generate calculated mean lithostatic density values (e.g., calculated mean lithostatic density (208a)) at well locations based on density values (e.g., density (208)) included in or derived from well logs (e.g., well log (207)).

In one or more embodiments, the calibration engine (203) is configured to extract the mean lithostatic density values (e.g., extracted means lithostatic density (205b)) of a well from the mean lithostatic density map (205a) at the well location. The calibration engine (203) compares the extracted mean lithostatic density values with the calculated values of mean lithostatic density (e.g., calculated mean lithostatic density (208a)) from the well log (207) in a linear regression. In the next step, the coefficients derived from the linear regression are applied to calibrate the mean lithostatic density map (205a) in the basin model (206).

In one or more embodiments, the lithostatic stress calibration system (200) performs the functionalities described above using the method described in reference to FIG. 3 below. Although the lithostatic stress calibration system (200) is shown as having three engines (201, 202, 203), in other embodiments of the invention, the lithostatic stress calibration system (200) may have more or fewer engines and/or more or fewer other components. Further, the functionality of each component described above may be split across components. Further still, each component (201, 202, 203) may be utilized multiple times to carry out an iterative operation.

Figure 3:
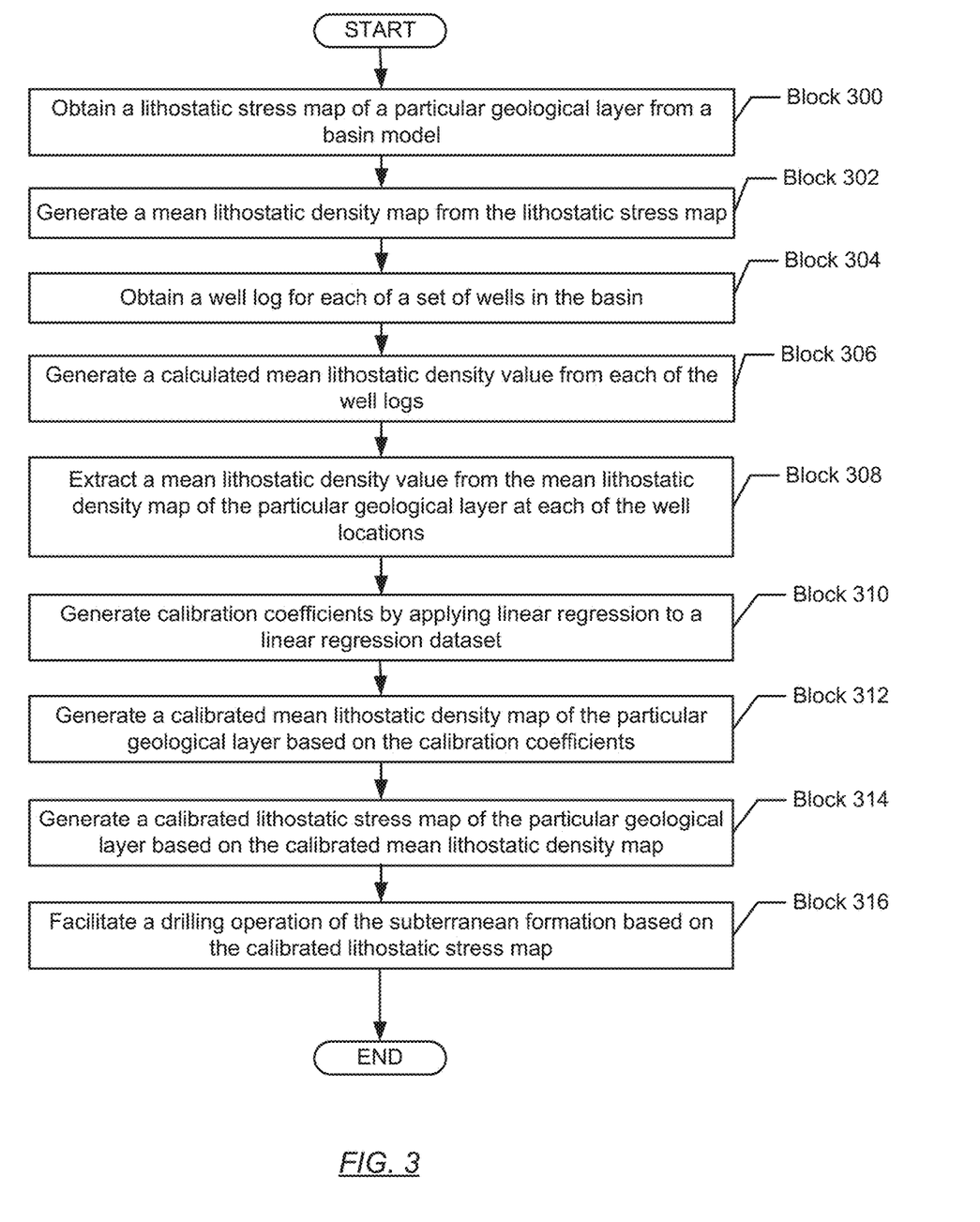
FIG. 3 shows a flowchart in accordance with one or more embodiments.

Turning to FIG. 3, FIG. 3 shows a flowchart in accordance with one or more embodiments. Specifically, FIG. 3 describes a method to calibrate the lithostatic stress map of a particular geological layer in a basin model based on available well data without re-simulating the basin model. One or more blocks in FIG. 3 may be performed using one or more components as described in FIGS. 1 and 2. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Initially in Block 300, a lithostatic stress map of a particular geological layer is obtained from a basin model. The lithostatic stress map includes lithostatic stress values at multiple locations in the basin.

In Block 302, a mean lithostatic density map is generated from the lithostatic stress map. For each location of the geological layer, the lithostatic stress value in the lithostatic stress map is divided by a depth of the location to generate a mean lithostatic density value in the mean lithostatic density map. Accordingly, the mean lithostatic density map includes mean lithostatic density values at multiple locations in the basin where the geological layer have varying depths according to the geometric shape of the geological layer.

In Bock 304, a well log is obtained for each of a set of wells in the basin. Each well log includes density measurements throughout a depth range along a borehole of the corresponding well. In particular, the depth range of each well log intercepts the depth of the particular geological layer at the corresponding well location.

In Block 306, a calculated mean lithostatic density value is generated from each of the well logs. Accordingly, a set of calculated mean lithostatic density values are generated corresponding to the set of wells. Each calculated mean lithostatic density in the set of calculated mean lithostatic density values corresponds to the depth where the particular geological layer intercepts the corresponding well.

In Block 308, a mean lithostatic density value is extracted from the mean lithostatic density map of the particular geological layer at each of the well locations. Accordingly, a set of extracted mean lithostatic density values are generated corresponding to the set of wells. Each extracted mean lithostatic density value in the set of extracted mean lithostatic density values corresponds to the depth where the particular geological layer intercepts the corresponding well. In particular, the set of calculated mean lithostatic density values and the set of extracted mean lithostatic density values correlate to each other based on common association to the set of wells. Accordingly, the set of calculated mean lithostatic density values and the set of extracted mean lithostatic density values are used as a linear regression dataset.

In Block 310, calibration coefficients are generated by applying linear regression to the linear regression dataset, i.e., the set of calculated mean lithostatic density values and the set of extracted mean lithostatic density values. In one or more embodiments, the linear regression is applied based on a mathematical liner regression equation $\rho_{cn}=A_n \rho_n + B_n$, where $\rho_{cn}$ and $\rho_n$ are corresponding values in the linear regression dataset, and $A_n$ and $B_n$ represent the calibration coefficients. In one or more embodiments, $\rho_n$ represents the extracted mean lithostatic density value at a well location in the mean lithostatic density map, and $\rho_{cn}$ represents a corresponding calculated mean lithostatic density value generated from a corresponding well log. In one or more embodiments, the index n represents the $n^{th}$ well in the set of wells.

In one or more embodiments, the linear regression dataset is expanded to include extracted mean lithostatic density values from multiple mean lithostatic density maps of multiple geological layers, as well as corresponding calculated mean lithostatic density values where the set of wells intercept each of the multiple geological layers. In such embodiments, the index n represents the $n^{th}$ geological layer for a particular well and the mathematical linear regression equation corresponds to equation (3) above.

In one or more embodiments, the linear regression is applied based on a mathematical simplification that each of the calibration coefficients $A_n$ and $B_n$ is independent of the index n or within a relative small range across all index values of n. In such embodiments, the calibration coefficients $A_n$ and $B_n$ are substituted with representative values of $A_n$ and $B_n$ in the mathematical linear regression equation. For example, the representative values of $A_n$ and $B_n$ may be calculated by averaging over all index values of n.

In Block 312, a calibrated mean lithostatic density map of the particular geological layer is generated based on the calibration coefficients. In one or more embodiments, the mean lithostatic density value at every location in the mean lithostatic density map is multiplied by the representative value of $A_n$ before adding the representative value of $B_n$ to generate the corresponding calibrated mean lithostatic density value in the calibrated mean lithostatic density map.

In Block 314, a calibrated lithostatic stress map of the particular geological layer is generated based on the calibrated mean lithostatic density map. In particular, the calibrated mean lithostatic density value at every location in the calibrated mean lithostatic density map is multiplied by the depth of the particular geologic layer at the corresponding location to generate the corresponding calibrated lithostatic stress value in the calibrated lithostatic stress map.

In Block 316, the calibrated lithostatic stress map is used to facilitate a drilling operation of the subterranean formation. In particular, each calibrated lithostatic stress map in the basin model may be generated using the Blocks described above in a timely manner without time consuming re-simulation of the basin model. The calibrated lithostatic stress maps are used as basis for predicting pore pressure to design a successful drilling program. Accordingly, petroleum exploration (more specifically, drilling operations) may be performed through an accurate and time-efficient well planning.

Figure 4:
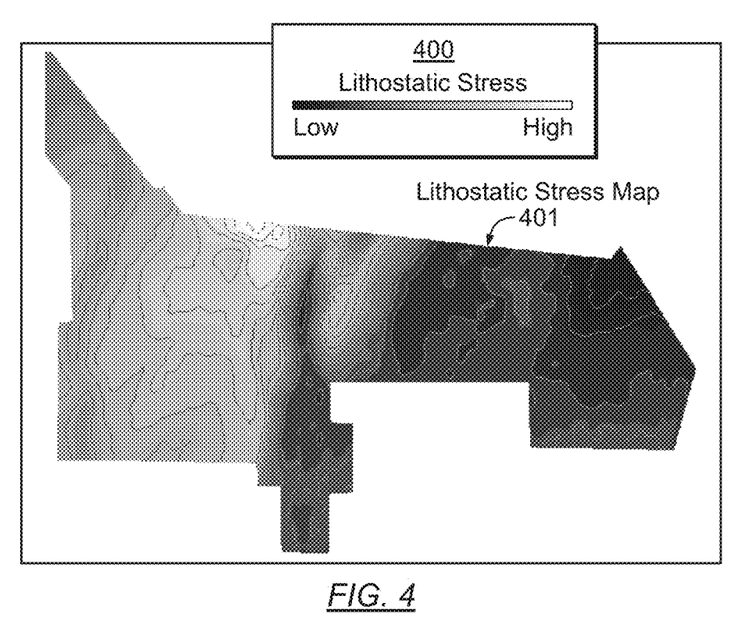
FIGS. 4-5 show an example in accordance with one or more embodiments.
Figure 5:
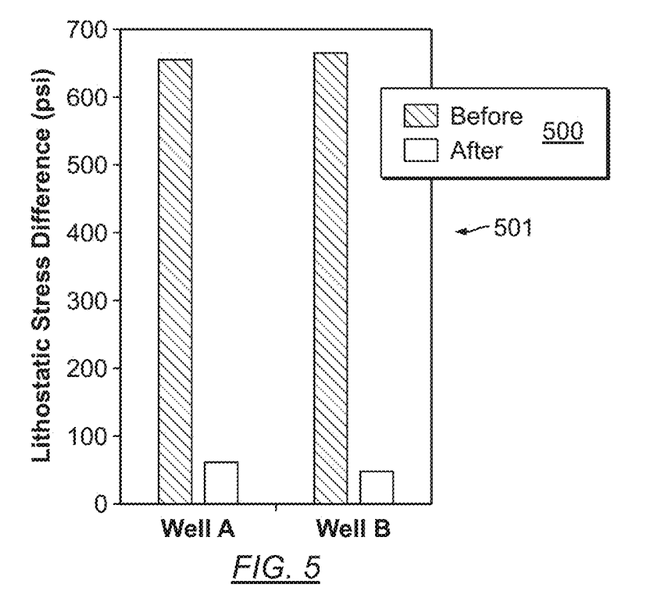

Turning to FIGS. 4-5, FIGS. 4-5 provides an example of calibrating the lithostatic stress map in a basin model. The example shown in FIGS. 4-5 may be, for example, based on one or more components depicted in FIGS. 1-2 above and the method flowchart depicted in FIG. 3 above. In one or more embodiments, one or more of the modules and/or elements shown in FIGS. 4-5 may be omitted, repeated, and/or substituted. Accordingly, embodiments of the invention should not be considered limited to the specific arrangements of modules and/or elements shown in FIGS. 4-5.

In petroleum exploration, obtaining reliable estimates of pore pressure from a basin model depends on a reliable estimates of lithostatics stress. Obtaining lithostatic stress from a basin model in a timely manner from basin modeling is often challenging due to the following:

(i) The reliability of predicting lithostatic stress from basin modeling depends on the calibration to porosity and density data from wells. As new well data are gathered, existing models need to be updated and refined to calibrate to the newly gathered data. Calibration is necessary for all geological layers encountered/intercepted by the well. The calibration of basin models to existing data requires an adjustment of input parameters from each previous model and re-simulating the model in an iterative manner.

(ii) Running simulations of regional 3D basin models is a time consuming process which is challenging for well planning in a timely manner.

FIGS. 4-5 illustrate an improved calibration method that replaces conventional techniques to calibrate the lithostatic stress output in basin modeling. The improved calibration method enables calibrating previously simulated lithostatic stress maps based on a basin model without the need for repeated basin modeling iterations.

As shown in FIG. 4, FIG. 4 illustrates a calibrated lithostatic stress map (401) of a particular geological layer that is generated using the improved calibration method. The calibrated lithostatic stress values throughout the calibrated lithostatic stress map (401) are depicted in FIG. 4 according to the legend (400). Using the improved calibration method, the calibrated lithostatic stress map (401) is generated based on well logs of a set of wells located at multiple well locations in the basin and intercepting the particular geological layer.

Turning to FIG. 5, FIG. 5 illustrates the efficacy of the improved calibration method using a blind well testing. Two wells A and B are randomly selected from the set of wells and excluded from the linear regression dataset used in the improved calibration method. The result of blind well testing are summarized in the plot (501) which shows the differences between the lithostatic stress values in the basin model and the lithostatic stress values calculated based on the well logs of the well A and well B. The differences are depicted according to legend (500). Specifically, the differences before applying the improved calibration method are shown in black while the differences after applying the improved calibration method are shown in white. The plot (501) shows a significant reduction of the differences between the lithostatic stress values of the basin model and the lithostatic stress values calculated based on the well logs after applying the improved calibration method.

Figure 6A:
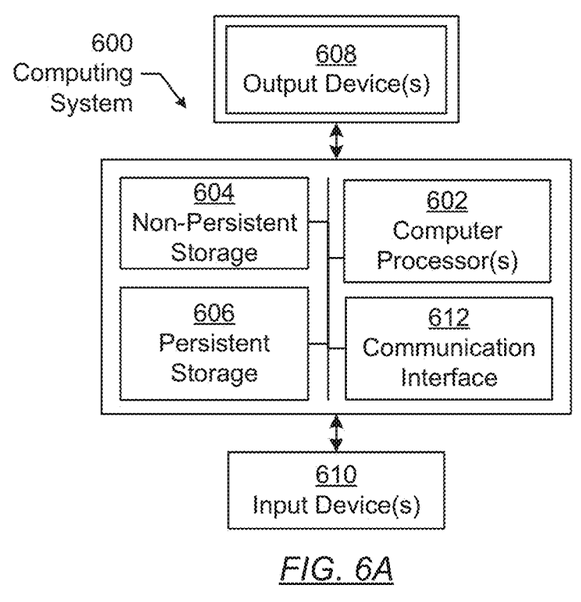
FIGS. 6A and 6B show a computing system in accordance with one or more embodiments.

Embodiments may be implemented on a computing system. Any combination of mobile, desktop, server, router, switch, embedded device, or other types of hardware may be used. For example, as shown in FIG. 6A, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 6B:
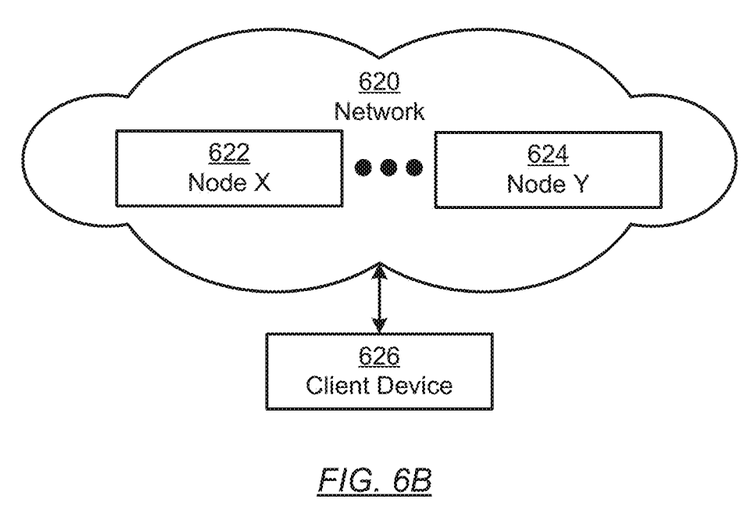

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include and/or perform all or a portion of one or more embodiments of the disclosure.

The computing system of FIG. 6A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 6A and the nodes and/or client device in FIG. 6B. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method for drilling a well in a subterranean formation, the method comprising:
    generating, for each of a plurality of geological layers in a basin model, a mean lithostatic density map from a lithostatic stress map, the plurality of geological layers corresponding to a plurality of depths at a potential well location in the subterranean formation;
    measuring a rock density throughout a depth range along a borehole of an existing well to generate a well log, wherein the depth range intercepts the plurality of geological layers at a well location of the existing well;
    generating, from the well log of the existing well, a plurality of calculated mean lithostatic densities at the well location of the existing well, the plurality of calculated mean lithostatic densities corresponding to the plurality of depths of the plurality of geological layers;
    extracting, using a computer processor and from the mean lithostatic density map of each of the plurality of geological layers, a plurality of extracted mean lithostatic density values corresponding to the plurality of depths at the well location;
    generating, using the computer processor and by applying linear regression to the plurality of calculated mean lithostatic densities and the plurality of extracted mean lithostatic density values, one or more calibration coefficients for calibrating lithostatic stress in the basin model;
    generating, using the computer processor and based on the one or more calibration coefficients, a calibrated lithostatic stress map from the lithostatic stress map;
    determining, using the calibrated lithostatic stress map, a drilling plan for the potential well location; and
    drilling, according to the drilling plan, the well at the potential well location.

2. The method according to claim 1, wherein determining the drilling plan-comprises:
    generating, based at least on the calibrated lithostatic stress map, an estimated pore pressure of the subterranean formation; and
    generating, based at least on the estimated pore pressure, the drilling plan.

3. The method according to claim 1, wherein generating the mean lithostatic density map from the lithostatic stress map comprises dividing a lithostatic stress value in the lithostatic stress map by a depth of a corresponding geological layer to generate a mean lithostatic density value in the mean lithostatic density map.

4. The method according to claim 3, wherein the mean lithostatic density value is a constant value of equivalent density that yields a value of the lithostatic stress at the depth of the corresponding geological layer equivalent to the lithostatic stress produced by a weight of overlaying material at the depth in the subterranean formation.

5. The method according to claim 3, wherein generating the plurality of calculated mean lithostatic densities comprises:
    generating, from the well log, a plurality of density values corresponding to the plurality of depths of the plurality of geological layers;
    generating, based on the plurality of density values, an average density value of the subterranean formation above said corresponding geological layer; and
    including the average density value as a calculated mean lithostatic density value in the plurality of calculated mean lithostatic densities.

6. The method according to claim 3, wherein generating the calibrated lithostatic stress map from the lithostatic stress map is based on a mathematical equation $\rho_{cn} = A_n \rho_n + B_n$, wherein $\rho_n$ represents the mean lithostatic density value in the mean lithostatic density map, $\rho_{cn}$ represents a corresponding calibrated lithostatic stress value in the calibrated lithostatic stress map, n represents said corresponding geological layer, and the one or more calibration coefficients are represented by $A_n$ and $B_n$.

7. The method according to claim 6, wherein the one or more calibration coefficients are constant across the plurality of geological layers.

8. A computer system for drilling a well in a subterranean formation, comprising:
    a processor; and a memory coupled to the processor and storing instruction, the instructions, when executed by the processor, comprising functionality for:

generating, for each of a plurality of geological layers in a basin model, a mean lithostatic density map from a lithostatic stress map, the plurality of geological layers corresponding to a plurality of depths at a potential well location in the subterranean formation;

measuring a rock density throughout a depth range along a borehole of an existing well to generate a well log, wherein the depth range intercepts the plurality of geological layers at a well location of the existing well;

generating, from the well log of the existing well, a plurality of calculated mean lithostatic densities at the well location of the existing well, the plurality of calculated mean lithostatic densities corresponding to the plurality of depths of the plurality of geological layers;

extracting, from the mean lithostatic density map of said each of a plurality of geological layers, a plurality of extracted mean lithostatic density values corresponding to the plurality of depths at the well location;

generating, by applying linear regression to the plurality of calculated mean lithostatic densities and the plurality of extracted mean lithostatic density values, one or more calibration coefficients for calibrating lithostatic stress in the basin model;

generating, based on the one or more calibration coefficients, a calibrated lithostatic stress map from the lithostatic stress map;

determining, using the calibrated lithostatic stress map, a drilling plan for the potential well location; and drilling, according to the drilling plan determined using the calibrated lithostatic stress map, the well at the potential well location.

9. The computer system according to claim 8, wherein determining the drilling plan comprises:

generating, based at least on the calibrated lithostatic stress map, an estimated pore pressure of the subterranean formation; and generating, based at least on the estimated pore pressure, the drilling plan.

10. The computer system according to claim 8, wherein generating the mean lithostatic density map from the lithostatic stress map comprises dividing a lithostatic stress value in the lithostatic stress map by a depth of a corresponding geological layer to generate a mean lithostatic density value in the mean lithostatic density map.

11. The computer system according to claim 10, wherein the mean lithostatic density value is a constant value of equivalent density that yields a value of the lithostatic stress at the depth of the corresponding geological layer equivalent to the lithostatic stress produced by a weight of overlaying material at the depth in the subterranean formation.

12. The computer system according to claim 10, wherein generating the plurality of calculated mean lithostatic densities comprises:

generating, from the well log, a plurality of density values corresponding to the plurality of depths of the plurality of geological layers;

generating, based on the plurality of density values, an average density value of the subterranean formation above said corresponding geological layer; and including the average density value as a calculated mean lithostatic density value in the plurality of calculated mean lithostatic densities.

13. The computer system according to claim 10, wherein generating the calibrated lithostatic stress map from the lithostatic stress map is based on a mathematical equation $\rho_{cn}=A_n\rho_n+B_n$, wherein $\rho_n$ represents the mean lithostatic density value in the mean lithostatic density map, $\rho_{cn}$ represents a corresponding calibrated lithostatic stress value in the calibrated lithostatic stress map, n represents said corresponding geological layer, and the one or more calibration coefficients are represented by $A_n$ and $B_n$.

14. The computer system according to claim 13, wherein the one or more calibration coefficients are constant across the plurality of geological layers.

15. A non-transitory computer readable medium storing instructions executable by a computer processor for drilling a well in a subterranean formation, the instructions, when executed by the processor, comprising functionality for:

generating, for each of a plurality of geological layers in a basin model, a mean lithostatic density map from a lithostatic stress map, the plurality of geological layers corresponding to a plurality of depths at a potential well location in the subterranean formation;

measuring a rock density throughout a depth range along a borehole of an existing well to generate a well log, wherein the depth range intercepts the plurality of geological layers at a well location of the existing well;

generating, from the well log of the existing well, a plurality of calculated mean lithostatic densities at the well location of the existing well, the plurality of calculated mean lithostatic densities corresponding to the plurality of depths of the plurality of geological layers;

extracting, from the mean lithostatic density map of said each of a plurality of geological layers, a plurality of extracted mean lithostatic density values corresponding to the plurality of depths at the well location;

generating, by applying linear regression to the plurality of calculated mean lithostatic densities and the plurality of extracted mean lithostatic density values, one or more calibration coefficients for calibrating lithostatic stress in the basin model;

generating, based on the one or more calibration coefficients, a calibrated lithostatic stress map from the lithostatic stress map;

determining, using the calibrated lithostatic stress map, a drilling plan for the potential well location; and drilling, according to the drilling plan determined using the calibrated lithostatic stress map, the well at the potential well location.

16. The non-transitory computer readable medium according to claim 15, wherein determining the drilling plan comprises:

generating, based at least on the calibrated lithostatic stress map, an estimated pore pressure of the subterranean formation; and generating, based at least on the estimated pore pressure, the drilling plan.

17. The non-transitory computer readable medium according to claim 15, wherein generating the mean lithostatic density map from the lithostatic stress map comprises dividing a lithostatic stress value in the lithostatic stress map by a depth of a corresponding geological layer to generate a mean lithostatic density value in the mean lithostatic density map.

18. The non-transitory computer readable medium according to claim 17, wherein the mean lithostatic density value is a constant value of equivalent density that yields a value of the lithostatic stress at the depth of the corresponding geological layer equivalent to the lithostatic stress produced by a weight of overlaying material at the depth in the subterranean formation.

19. The non-transitory computer readable medium according to claim 17, wherein generating the plurality of calculated mean lithostatic densities comprises:
   generating, from the well log, a plurality of density values corresponding to the plurality of depths of the plurality of geological layers;
   generating, based on the plurality of density values, an average density value of the subterranean formation above said corresponding geological layer; and
   including the average density value as a calculated mean lithostatic density value in the plurality of calculated mean lithostatic densities.

20. The non-transitory computer readable medium according to claim 17, wherein generating the calibrated lithostatic stress map from the lithostatic stress map is based on a mathematical equation $\rho_{cn} = A_n \rho_n + B_n$, wherein $\rho_n$ represents the mean lithostatic density value in the mean lithostatic density map, $\rho_{cn}$ represents a corresponding calibrated lithostatic stress value in the calibrated lithostatic stress map, n represents said corresponding geological layer, and the one or more calibration coefficients are represented by $A_n$ and $B_n$, wherein the one or more calibration coefficients are constant across the plurality of geological layers.

* * * * *